United States Patent

Yang et al.

[11] Patent Number: 5,900,037
[45] Date of Patent: May 4, 1999

[54] METHOD AND APPARATUS FOR PRODUCING MINERAL WOOL

[75] Inventors: Alain Yang, Rantigny; Jean-Marie Thouvenin, Chalon; Jean-Yves Aube, Clermont, all of France

[73] Assignee: Isover Saint-Gobain, Courbevoie, France

[21] Appl. No.: 08/849,717
[22] PCT Filed: Oct. 23, 1996
[86] PCT No.: PCT/EP96/04602
§ 371 Date: Nov. 20, 1997
§ 102(e) Date: Nov. 20, 1997
[87] PCT Pub. No.: WO97/15532
PCT Pub. Date: May 1, 1997

[30] Foreign Application Priority Data

Oct. 27, 1995 [DE] Germany .................... 195 40 109

[51] Int. Cl.⁶ .................... C03B 37/04; C03B 37/06; C03B 5/44; C03B 37/10
[52] U.S. Cl. ................ 65/459; 65/460; 65/466; 65/510; 65/521; 65/522; 65/524
[58] Field of Search ............. 65/459, 460, 461, 65/466, 521, 522, 523, 524, 510; 264/8

[56] References Cited

U.S. PATENT DOCUMENTS

| | | | |
|---|---|---|---|
| 2,931,062 | 4/1960 | Leaman | 18/2.6 |
| 3,304,164 | 2/1967 | Charpentier et al. | 65/14 |
| 5,154,746 | 10/1992 | Okuma et al. | 65/6 |
| 5,554,324 | 9/1996 | Bernard et al. | 264/8 |
| 5,601,628 | 2/1997 | Battigelli et al. | 65/461 |

Primary Examiner—Peter Chin
Assistant Examiner—Jacqueline A Ruller
Attorney, Agent, or Firm—Oblon, Spivak, McClelland, Maier & Neustadt, P.C.

[57] ABSTRACT

The present invention furnishes a method for producing mineral wool wherein a molten mineral material is fed into a spinner (1) the peripheral wall (2) of which comprises a multiplicity of orifices with small diameters wherethrough the mineral molten material is centrifuged to form filaments which are subjected to a supplementary attenuating effect of a gas flow flowing along and heating the peripheral wall (2) of the spinner (1) and generated by a concentric annular burner (8) arranged concentrically to the spinner (1), and wherein the exit area of the burner (8) is subdivided into an annular radially inner hot zone and an annular radially outer cooling zone of substantially lower temperature; the invention moreover concerns an apparatus for implementing the method.

13 Claims, 4 Drawing Sheets

METHOD AND APPARATUS FOR PRODUCING MINERAL WOOL

The invention relates to a method for producing mineral wool with the molten mineral material being fed into a spinner as defined in the opening clause of claim 1, and to an apparatus for fiberization of mineral material by means of internal centrifuging with a spinner as defined in the opening clause of claim 2.

Mineral fibers of high quality may be produced by internal centrifugation wherein the mineral melt is fed into the interior of a spinner rotating at high speed and having a multiplicity of small orifices in its peripheral wall wherethrough the melt may emanate as melt filaments of correspondingly small diameter. The exiting filaments are subjected to the blast of an annular burner and thereby attenuated to form fibers of a required fineness which subsequently solidify and accumulate on a lower conveyor where the mineral fiber mat is formed. Such process is well known in the art as so-called TEL process.

With such fiberizing units, mineral materials of varying compositions are fiberized. Such mineral compositions may have high, normal or low melting points and thus different fiberization temperatures. The burner of such fiberizing units, on the other hand, operates with a specified optimum adjustment and thus at a specified operation temperature which should not be changed substantially so as not to leave the region of optimum burner operation. Thus, the blast gases of the burner may have a temperature of 1550–1600° C. with optimum burner operation adjustment, which would be a suitable temperature for fiberizing high-melting glasses. Through minor changes of the burner adjustment this temperature could be lowered to e.g. 1300–1350° C. with still close to optimum burner adjustment so as to accommodate different temperature needs of lower melting glasses.

Overheating of the filaments of materials with low melting point will lead to a reduction of viscosity to such an extent that the melt attenuated by the blast gases will escape the attenuation zone before solidification such that, under the influence of surface tensions, the still molten fibers will transform into unfiberized particles undesirable in the resulting mineral wool mat.

Thus, there is a need to fiberize other mineral material like low-melting glasses with temperatures of the blast gasses as low as 1200° C. or even less. Reduction of the burner outlet temperature to such extent by changing the burner adjustment would lead to non-optimum burner operating conditions which are undesirable.

It is thus an object of the present invention to provide a method and an apparatus which allow fiberization of low-melting mineral materials requiring substantially lower blast gas temperatures than produced by the burner at optimum operating conditions.

This object is attained in methodical respect in that the exit area of the burner is subdivided into an annular radially inner hot zone and an annular radially outer cooling zone of substantially lower temperature. In constructional respect, this object is obtained in that there are provided injection means for cooling gas like air in the outer peripheral wall of the burner outlet, and that the direction of injection is essentially transverse to the flow direction of the burner gases in the region of injection.

With the invention thus the temperature of the blast gases is not reduced homogenically as in the case where the admission of combustibles to the burner was reduced, or where cooling air was premixed to the burner gases. This has as consequence that the radially inner zone remains comparatively hot and possibly even at the temperature of the uncooled burner gases. This effect is desirable as the region of the rows of orifices in the peripheral wall of the spinner should be kept at comparatively high temperatures above the liquidus or the temperature of devitrification or cristallisation to allow the flow of glass through the orifices.

On the other hand, it is desirable to cool down the attenuated fibers rather rapidly so as to solidify them sufficiently to avoid a spring-back effect of the attenuated fibers into material grains under the influence of surface tension and also to prevent the emissions of volatile components of the glass, for example sodium, by a strong effect of temperature. Such material grains poor quality fibers or other nonfiber forms also lead to an increased content of unfiberized particles in the resulting mineral wool mat. The rather drastic cooling effect brought about in the radially outer cooling zone tends to avoid such undesired effect.

Moreover, the injection of cooling gas through the outer peripheral wall of the burner outlet does not give raise to any substantial readjustment work at the burner in case of change of material composition. If e.g. glass with a high melting point is fiberized, the admission of cooling air may simply be shut off, and in case of fiberizing glasses of lower melting points, any required amount of cooling air may be admitted with the simple turn of a valve. Thus, the optimum adjustment for any material composition to be fiberized may be obtained without any appreciable effort.

The fact that the direction of injection of the cooling gases is essentially transverse to the flow direction of the burner gases avoids any appreciable increase in the impulse and the effects of kinetic energy of the burner gases. Therefore, the admission of cooling gas does not appreciably change the attenuation effect brought about by the burner gases so that the admission of cooling gas does not change the operating conditions of the apparatus in this respect. While the cooling effect of the cooling gas tends to increase the viscosity of the mineral material, this is essentially balanced by the increase of energy content of the overall gas flow by the introduction of the cooling gas. Thus the operating conditions of the apparatus including the attenuation effect remain substantially unchanged regardless of the admission of a greater or lower amount of cooling gas to accommodate the temperature needs of the glass composition being fiberized.

From PCT 94/04469 it is known to have an additional outer blower supplying cooling air from a position radially outward of the burner outlet. In this case, the burner outlet is positioned radially inwardly of the upper outer rim of the spinner. Such arrangement is especially suited for fiberization of hard glasses having a high melting point and having low viscosity at the melting point. The cooling air in this known embodiment intersects the flow of blast gases at the outer periphery of the spinner at a point where the attenuation into fibers is almost completed so as to increase the viscosity at that point. The blower gas flow is essentially parallel to the flow of blast gas and thus adds to the impulse and the kinetic energy of the composite flow. With the present invention, however, the gases emanating from the burner outlets themselves are cooled down in a specific inhomogenous way without appreciably increasing the impulse thereof to allow fiberization of mineral material with a temperature characteristic compared to which the temperature of the uncooled blast gas would be unduly high so as to produce unfiberized particles.

The subclaims contain further improvements of the apparatus of invention.

In a preferred embodiment, the diameter of each orifice in the form of a through hole is between 1 and 3 mm, in particular near 2 mm. In this way suitable flow conditions for the cooling gas to penetrate into the flow of blast gas are obtained.

The distance between two consecutive ones of the evenly distributed orifices in the form of through holes is preferably between 2 and 15 mm, in particular between 5 and 12 mm with the greater values being preferred with single row arrangements and the lower values with multiple row arrangements with the distance measured between the staggered orifices of different rows. The distance between two rows is typically between 2 and 10 mm.

Also, the injection means may comprise an outlet in the form of at least one continuous circumferential slit, such arrangement allowing easier adjustment of flow characteristics by adjusting the slit width. Typically this slit width is between 0.3 and 1 mm.

Further advantages, details and features of the invention will be apparent from the following description in conjunction with the drawings wherein FIG. 1 is a schematized view of an apparatus of the invention in longitudinal section;

FIG. 1b is a further modification in a view as FIG. 1a;

Figure 1:
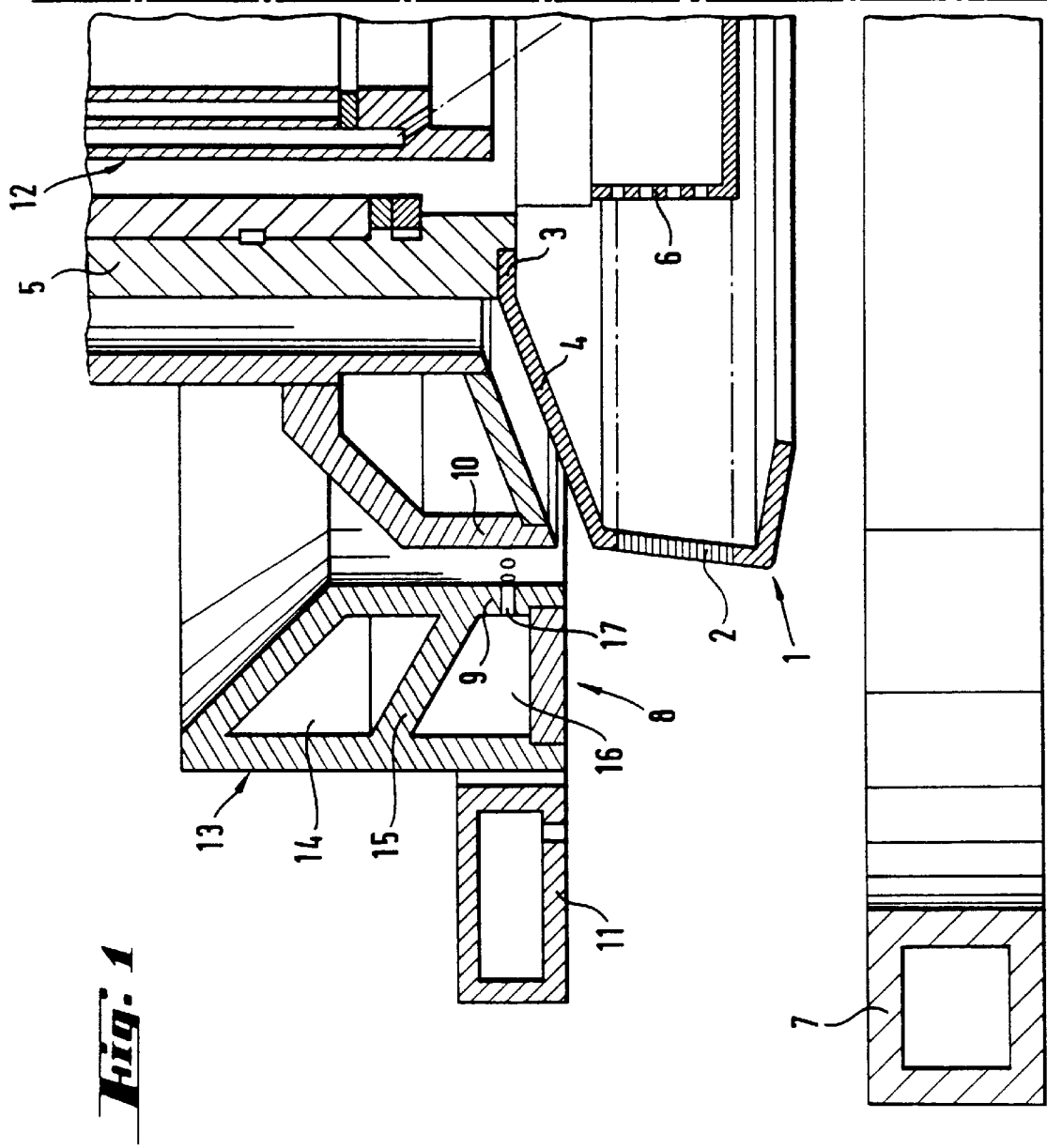

The fiberizing unit of the apparatus as shown in a simplified manner in FIG. 1 consists mainly of a spinner 1, the peripheral wall 2 of which has a multiplicity of discharge orifices. The peripheral wall 2 is connected to a flange 3 via a connecting band 4, referred to as a "veil" because of its shape. As illustrated by the drawing, peripheral wall 2, veil 4 and flange 3 are formed as a whole in one single, unitary peace.

Flange 3 is mounted on a supporting shaft 5 which is hollow in the shown embodiment, and through this cavity the molten mineral material is supplied.

The supporting shaft 5—or even the flange 3—furthermore supports a concentric distributing means 6, usually referred to as a "cup" or "basket". The distributing cup 6 with a peripheral wall which has a relatively low number of orifices with comparatively large diameters serves as the bottom wall of the spinner and distributes the stream of molten mineral material by separating it into a plurality of filaments which are spread over the inner circumference of the peripheral wall 2.

The spinner 1 is surrounded by various heating devices: an annular medium frequency coil 7 which particularly heats the bottom portion of the spinner 1, above all in order to compensate insufficient heating by the burner and the cooling upon contact of environmental air which is markedly cooled by the considerable quantities of air sucked by the revolution of the spinner 1, and a water-cooled annular external burner 8. The ends of peripheral walls 9 and 10 of the external burner 8 are arranged at a slight distance from the spinner 1, e.g. in the order of 5 mm with the inner wall 10 approximately flush with the upper outer edge of spinner 1.

The annular external burner 8 generates a high temperature and high velocity gas flow directed substantially in a vertical direction and thus passing along peripheral wall 2. The gas flow, on the one hand, serves to heat or maintain the temperature of peripheral wall 2, and on the other hand contributes to attenuating the filaments of the spun-off molten mineral into fibers.

As represented in the drawing, the external burner 8 is preferably surrounded at a greater radial distance by a blower ring 11 of cold air, the main objective of which is to limit radial expansion of the hot gas flow and thereby keep the formed fibers from getting into contact with the annular magnet 7.

The external heaters of spinner 1 are complemented in its inside by an internal annular burner 12 which is positioned inside the supporting shaft 5 and utilized during the start-up phase of the fiberization unit for preheating the cup 6.

The general construction of the fiberizing unit as described above is conventional. According to the invention, the ring conduit containing the cooling chamber 14 for the outer peripheral wall 9 is subdivided by a partition wall 15 so as to accommodate a lower plenum chamber 16 for cooling air. Plenum chamber 16 is in fluid communication with the burner outlet through a series of orifices 17 in outer peripheral wall 9. Through orifices 17 cooling air, or any other cooling gas, enters into the burner outlet and is there admixed to the burner gases.

Orifices 17 extend in transverse direction to the flow direction of the burner gases in the burner outlet. Thus, the kinetic energy of the blast gas emanating from the burner outlet is not appreciably changed so that attenuation conditions are not appreciably influenced by the presence or absence of cooling air.

Form and arrangement of orifices 17 may be adapted to the needs of the given case. In the exemplary installation shown, there is one row of orifices 17 with a diameter of 2 mm and a distance between two consecutive orifices 17 of 10 mm. Taking into account that the spinner diameter is 400 mm, there are 120 orifices 17 arranged around the entire circumference of ring conduit 13 in even distribution in one row.

Figure 1A:
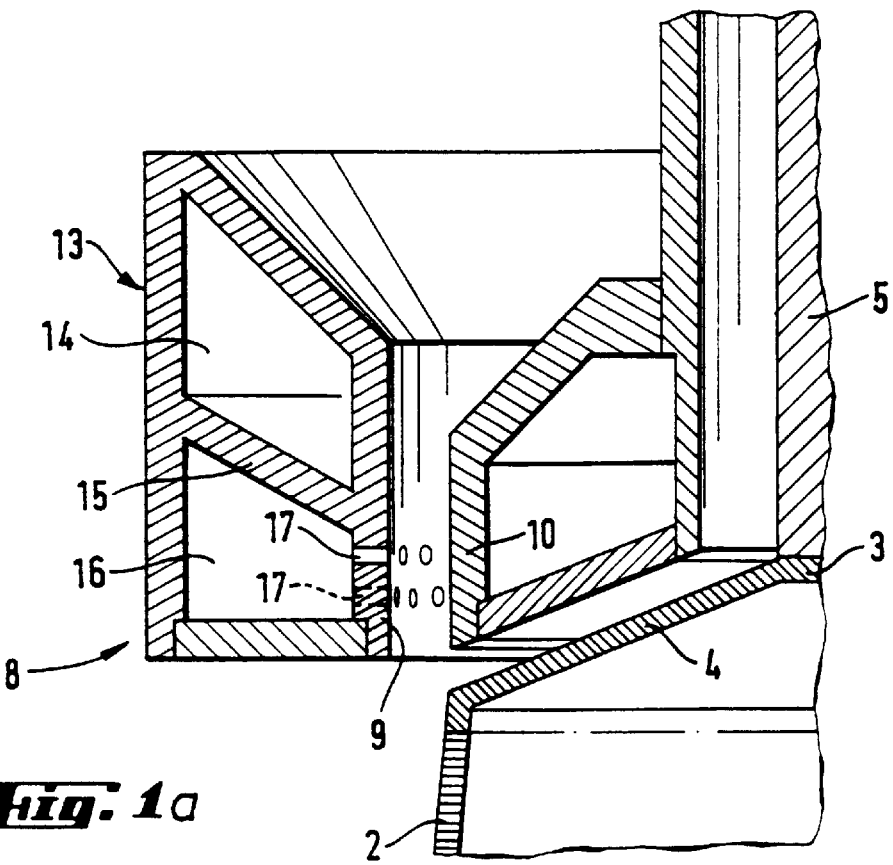
FIG. 1a is a detail of FIG. 1 in an enlarged view but for an alternative embodiment.
Figure 1B:
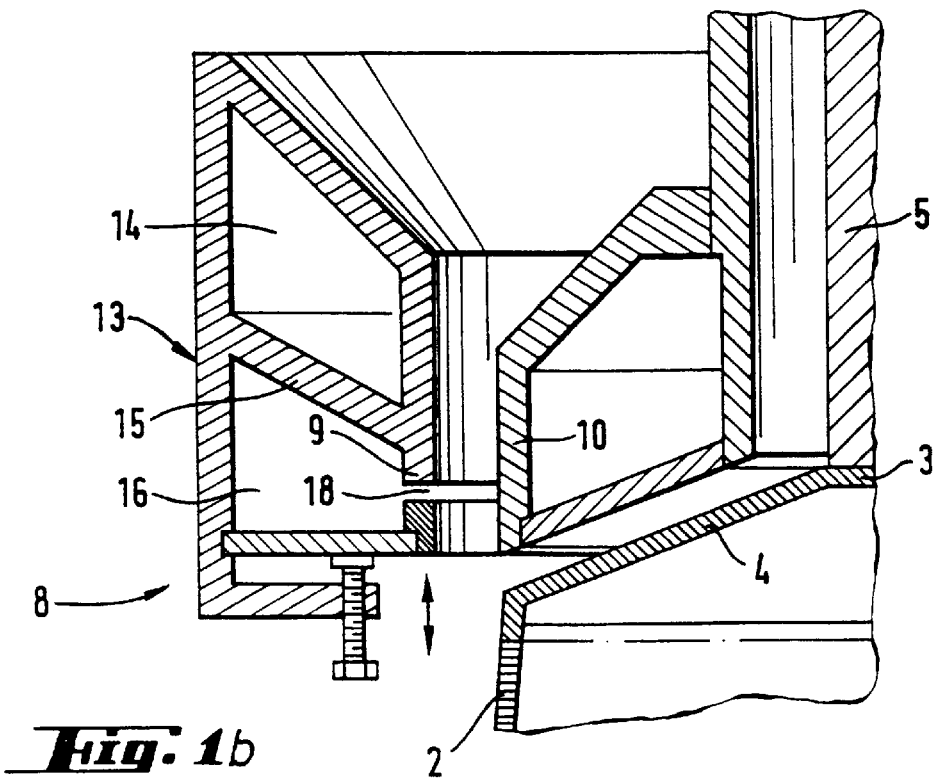

If suitable, the orifices 17 could also be arranged in two or more rows, and FIG. 1a shows an example for such an embodiment with the mutual distance between neighbouring 2 mm orifices 17 of different rows being 5.5 mm. Also, the orifices 17 could be replaced by a slit 18 as shown in FIG. 1b which would allow the advantage of adjustment of the vertical slit width as schematically shown and symbolized by the double arrow in FIG. 1b. With such alternative arrangement of orifices 17 or slit 18, various needs of practical application may be easily accommodated in a given case.

Figure 2:
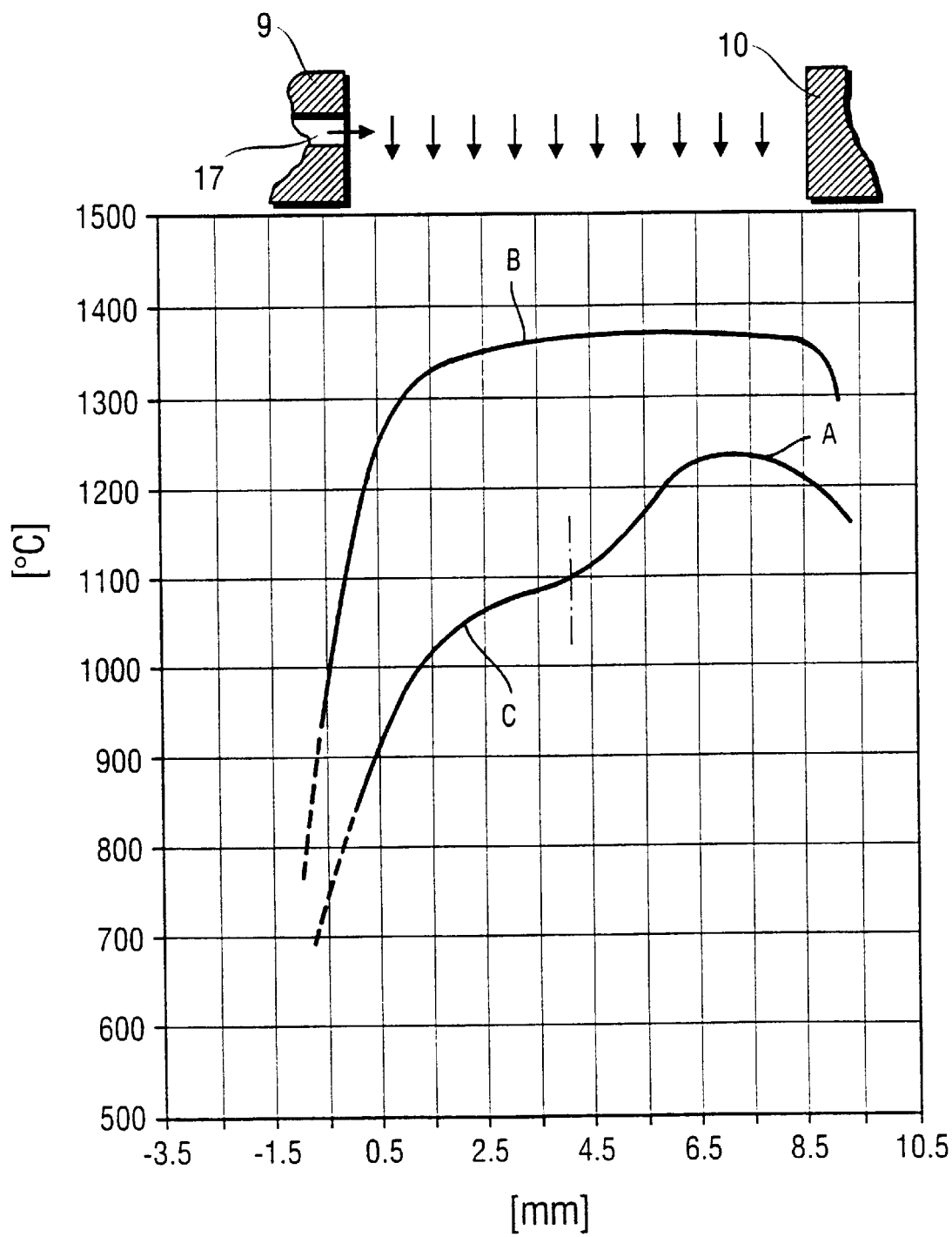
FIG. 2 is a representation of the temperature distribution across the width of the burner outlet just below the outlet area.
Figure 3:
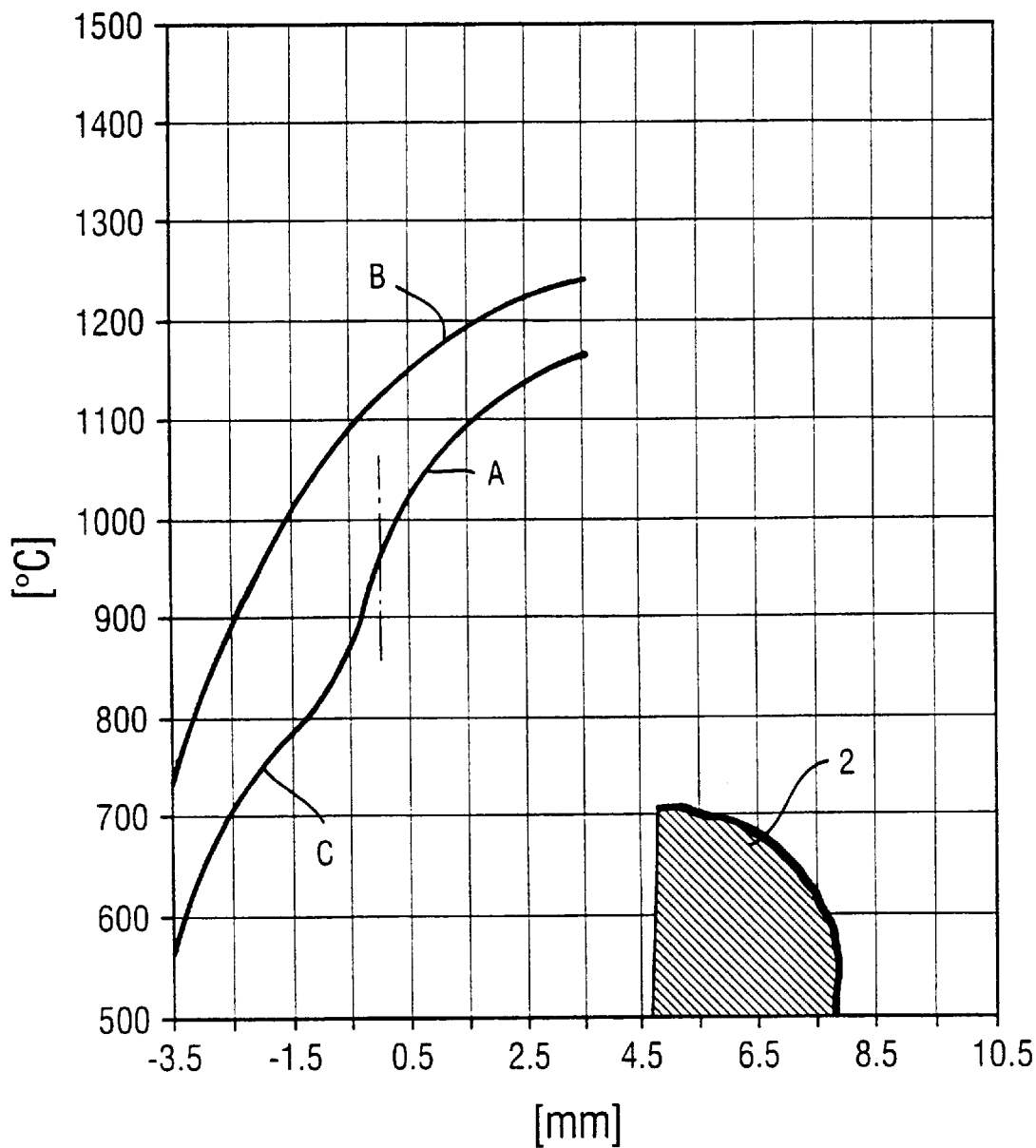
FIG. 3 is a representation of the temperature distribution resulting radially outwardly of the peripheral wall of the spinner of the centrifuging device.

In FIGS. 2 and 3 the temperature distribution measured with two practical embodiments is shown. Whereas FIG. 2 shows the temperature distribution at a level 1 mm below the exit area of a burner outlet, FIG. 3 shows the temperature distribution at a level of the uppermost orifices in the peripheral wall 2 of spinner 1 at a distance of 19 mm below the exit area of the burner outlet. The radial distance of measurement given in FIG. 2 and 3 of the abscissa is measured 10 from outlet wall 9.

Temperature distribution curve A was measured at an embodiment as shown in FIG. 1a having two rows of orifices 17, whereas curve B is without injection of cooling gas.

The curves A and B appear rather self-explanatory.

FIG. 2 demonstrates the influence of the cooling gas at the left-hand side lowering the temperature in this cooled zone denominated C. As is shown in FIG. 3, the temperature close to the perimeter of spinner 1 is elevated, and sharply decreases in cooled zone C at a distance of several millimeters radially outside thereof so as to assist quick solidification of the attenuated fibers.

The effects brought about by the invention have been described above with an emphasis on the production of fibers from low-melting glasses. However, these effects may obviously be utilized also for fiberization of mineral material with high melting points if the burner temperature is generally increased and subsequently cooled down by the supply of cooling gas through orifices 17 or slit 18.

We claim:

1. An apparatus for fiberization of mineral material, comprising:
    a spinner, a peripheral wall of which comprises a multiplicity of orifices;
    a concentric annular external burner arranged concentrically to the said spinner and configured to generate a heated gas flow directed along said peripheral wall of said spinner;
    a cooling gas injector provided in an outer peripheral wall of an outlet of said external burner and configured to inject cooling gas in a direction substantially perpendicular to a flow direction of the heated gas flow in a region of injection.

2. The apparatus according to claim 1, wherein a diameter of each orifice is between 1 and 3 mm.

3. The apparatus of claim 1, wherein a distance between two consecutive said orifices is between 2 and 15 mm.

4. The apparatus of claim 3, wherein said orifices are arranged in at least two rows with a distance between neighboring rows being between 2 and 10 mm, preferably 5 mm.

5. The apparatus of claim 1, further comprising an outlet in the form of a continuous circumferential slit having a width.

6. The apparatus of claim 5, wherein the width of said slit is between 0.3 and 1 mm.

7. The apparatus of claim 5, wherein the width of said slit is adjustable.

8. The apparatus of claim 2, wherein a distance between two consecutive said orifices is between 2 and 15 mm.

9. The apparatus of claim 2, wherein said cooling gas injector comprises an outlet in the form of a continuous circumferential slit.

10. The apparatus of claim 3, wherein said cooling gas injector comprises an outlet in the form of a continuous circumferential slit.

11. The apparatus of claim 4, wherein said cooling gas injector comprises an outlet in the form of a continuous circumferential slit.

12. The apparatus of claim 6, wherein the width of said slit is adjustable.

13. A method for producing mineral wool, comprising the steps of:
    feeding molten mineral material into a spinner having a peripheral wall which comprises a plurality of orifices;
    rotating the spinner such that the molten material is centrifuged through the orifices and thereby formed into filaments;
    directing a heated gas flow along an outer surface of the peripheral wall of the spinner, wherein the heated gas flow is discharged from an annular burner arranged concentrically to the spinner; and
    directing a cooling gas in a direction substantially perpendicular to a flow direction of the heated gas flow from an outer cooling zone of an exit area of the burner;
    wherein the exit area of the burner is divided into an annular radially inner hot zone and an annular radially outer cooling zone with a temperature substantially lower than a temperature of the inner hot zone.

* * * * *